Dec. 21, 1965 E. L. MATTSON 3,224,602
APPARATUS FOR MANIPULATING WORKPIECES
Original Filed March 21, 1961 2 Sheets-Sheet 1

INVENTOR.
Everett L. Mattson

Dec. 21, 1965 E. L. MATTSON 3,224,602
APPARATUS FOR MANIPULATING WORKPIECES
Original Filed March 21, 1961 2 Sheets-Sheet 2
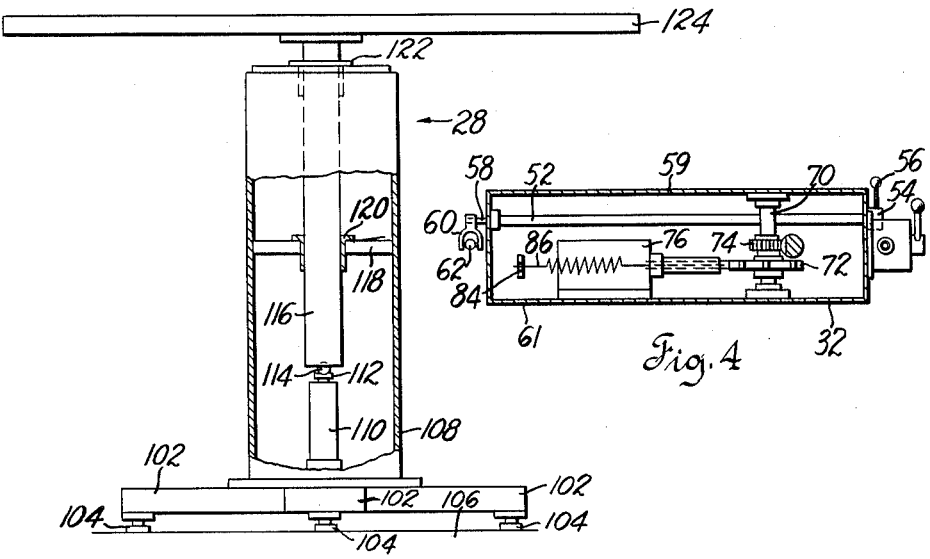
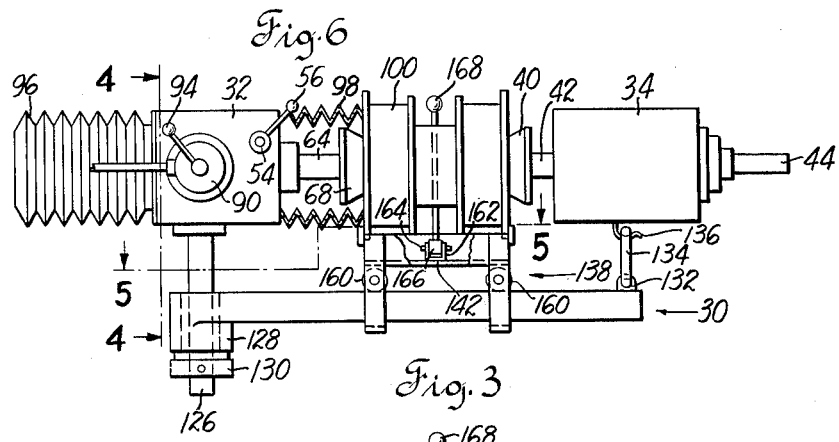
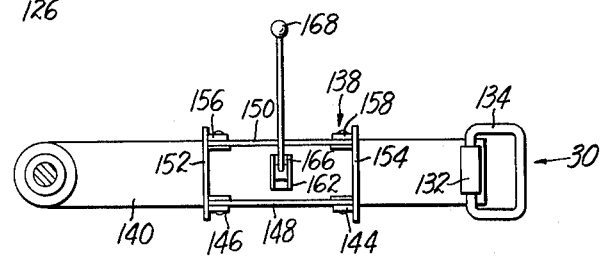
INVENTOR.
Everett L. Mattson

United States Patent Office 3,224,602
Patented Dec. 21, 1965

3,224,602
APPARATUS FOR MANIPULATING WORKPIECES
Everett L. Mattson, Brookfield, Wis., assignor to Automatic Welding Company, Waukesha, Wis., a corporation of Wisconsin
Original application Mar. 21, 1961, Ser. No. 97,378, now Patent No. 3,109,918, dated Nov. 5, 1963. Divided and this application June 6, 1963, Ser. No. 286,045
8 Claims. (Cl. 214—1)

The present invention relates to apparatus for manipulating workpieces which as herein disclosed is utilized in conjunction with an automatic welding machine and more particularly an improved machine for resurfacing the rollers and idlers of a track vehicle by depositing beads of weld metal thereon. This application is a division of copending application Serial No. 97,378, filed March 21, 1961, now Patent No. 3,109,918.

The present invention may be used to deliver workpieces to and from a yoke mounted chuck arrangement. For example, one roller at a time may be gripped, locked, welded on the surfaces normally flat with respect to the welding head, and the entire yoke pivoted through an arc to orient the flanges relatively level with respect to the welding head. The yoke may be locked in any position desired. Therefore, the chuck will position and manipulate rollers such that the flanges as well as the other worn areas of the rollers may be rebuilt. The mechanism for operating the chucks to grip and release the roller, as well as the mechanism for driving the roller during the welding operation, may be disposed within the yoke so that the yoke is counterbalanced and may be easily manually pivoted between the various positions into which it might be desirable to move the yoke.

It is an object of the present invention to provide a machine of the character above described wherein a workpiece supply is provided adjacent to the yoke. The workpiece supply may comprise a rotary workpiece carrier. The rotary workpiece carrier may be in the form of a table mounted for rotation about a vertical axis and comprising a surface upon which workpieces are adapted to rest. When the carrier takes that form it may be made adjustable in the vertical direction so that rollers of varying diameters may be accommodated. The machine may be provided with a swingable transfer member in the form of an arm movable between the table and the yoke for transferring rollers back and forth between the table and the yoke.

It is another object of the present invention to provide a machine of the character described above wherein the arm is pivotally connected to the yoke and is adjustable axially along the shaft upon which it is pivotally connected to the yoke so that the swingable arm may accommodate rollers of varying size also.

It is still another object of the present invention to provide a machine of the character above described wherein the swingable arm is provided with a carriage movably mounted thereon for movement along the arm so that when a roller is placed upon the carriage and the pneumatic chuck is operated, the roller may automatically be moved to the desired position beneath the welding apparatus since the carriage will roll along the arm under the pressure exerted by the chucking mechanism.

Further objects of the invention involve the provision of an ejection mechanism on the arm carriage so that rollers may be ejected while still hot from welding without being directly handled; and provision of a combination catch clamp and handle arrangement which operates between the yoke and the end of the swingable arm remote from the end pivotally coupled with the yoke whereby the handle arrangement on the swingable arm may be engaged with the spring catch to hold the arm in place during the welding operation and may also be used to swing the swingable arm.

Various other objects and advantages will become apparent as the description of this invention proceeds and various modifications and changes may be made to the structure hereinafter described without departing from the spirit of the invention and such modifications and changes and additional objects are intended to be covered by the scope of the appended claims.

In the drawings:

FIGURE 3 is a front elevational view of the yoke shown in FIGURE 2 with portions being broken away to show details of construction;

FIGURE 4 is a cross-sectional view taken along line 4—4 of FIGURE 3;

FIGURE 5 is a top plan view taken along line 5—5 of FIGURE 3; and

FIGURE 6 is a front elevational view of a rotatable table used in the present invention with portions being broken away to show details of construction.

Figure 1:
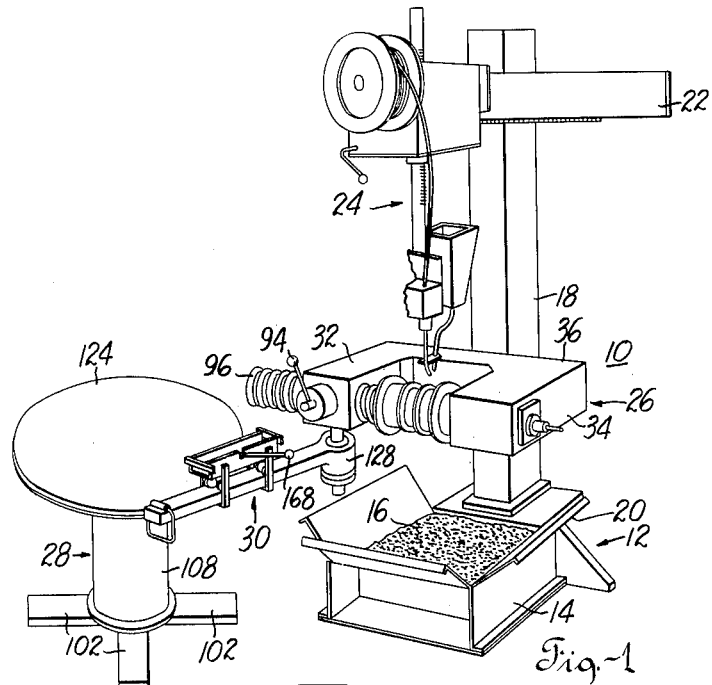
FIGURE 1 is a perspective view of a machine embodying the present invention.

Referring now to the drawings, and particularly to FIGURE 1 of the drawings, a roller resurfacing machine is shown and identified generally by the numeral 10. Roller resurfacing machine 10 is comprised of a number of component parts including a base 12 having a front portion 14 which serves as a flux catching tub and which is shown in FIGURE 1 as containing flux denoted by numeral 16. An upright member 18 is coupled at one extremity to the rear portion 20 of base 12 and extends upwardly therefrom. A cross member 22 is mounted adjacent to the upper extremity of upright member 18. A vertically and horizontally adjustable welding means identified generally by the numeral 24 is mounted upon cross member 22. There is a yoke generally identified by the numeral 26 pivotally mounted to upright member 18 intermediate the front portion 14 of base 12 and the welding means 24 for a reason which will hereafter become obvious.

A vertically adjustable rotatable table 28 is disposed adjacent to yoke 26 and a swingable arm or transfer member 30 is pivotally coupled with yoke 26 for swinging movement from a position immediately adjacent to table 28 to a position directly beneath yoke 26.

Figure 2:
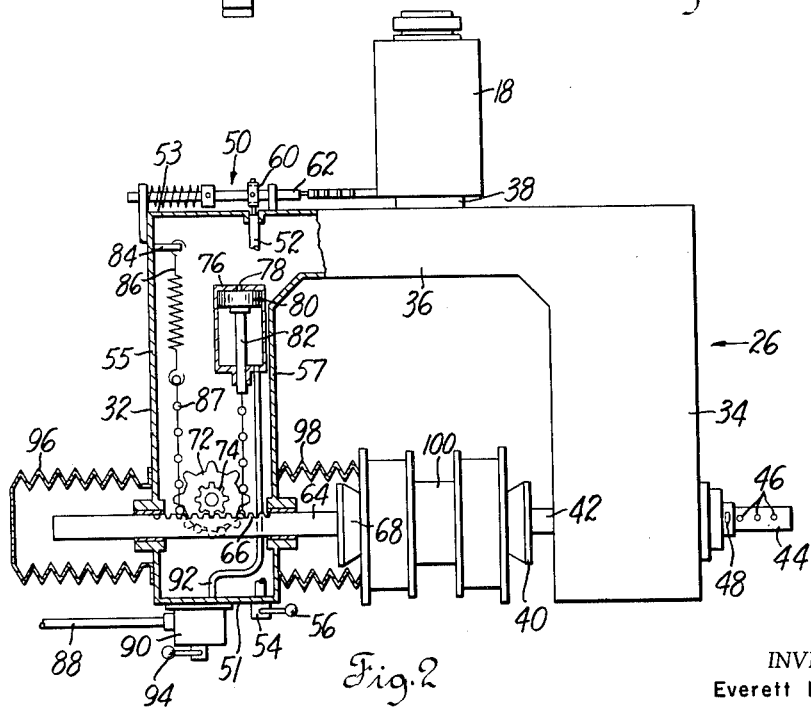
FIGURE 2 is a top plan view of the yoke arrangement shown in FIGURE 1, with portions of the yoke being broken away to show details of the pneumatic chucking mechanism.

Referring now to FIGURE 2, it will be noted that yoke 26 is generally U-shaped in cross section, and therefore comprises essentially a first leg or mounting member 32, a second leg or mounting member 34, and a bight 36 interconnecting legs 32 and 34. It will be noted that yoke 26 is pivotally connected to upright member 18 by virtue of a pivot shaft 38. Essentially the structure of leg 34 is the same as the structure of the corresponding leg in Patent No. 3,024,349, and need not be further described herein except to state that there is a chuck driving unit contained within leg 34 and the structure which shows in the drawings includes a workpiece engaging element in the form of a drive cone 40 fixedly mounted upon a rotatable driven shaft 42. On the opposite side of leg 34 from drive cone 40, there is shown a concentric quill shaft 44 having a plurality of apertures 46. A cotter key 48 is provided which may be dropped through similar apertures of shaft 42 and through apertures 46 of shaft 44 as they register in any selected position to couple the shafts 42 and 44 together and provide the drive mechanism operation described in Patent No. 3,024,349.

A locking bar and plate structure generally identified by the numeral 50 is provided which is similar in most respects to the locking bar and plate structure taught in Patent No. 3,024,349. The only change is that a rotatable shaft 52 is shown which is journaled at its extremities in the fore and aft walls 51 and 53 respectively of first leg 32. The end of shaft 52 which is journaled in the fore wall 51 of first leg 32 protrudes forwardly through wall 51 and terminates in fixed engagement with a collar 54 provided with an operating handle 56. Shaft 52 terminates at its opposite extremity in the shoulder portion 58 of a bifurcated member 60 which partially surrounds bar 62 of mechanism 50 whereby the mechanism 50 may be operated in a manner similar to that described in Patent No. 3,024,349 but more conveniently, since the operator can work mechanism 50 through the linkage arrangement described by operating handle 56 thereby rendering it unnecessary for the operator to walk around to the rear part of yoke 26 every time it is desired to unlock the yoke 26 and change its position.

A pneumatic chuck operating arrangement is provided within leg 32 and includes an axially slidable, freely rotatable axle 64 journaled in the side walls 55 and 57 respectively of leg 32 and provided with a rack portion 66. The extremity of axle 64 which is in closest proximity to drive cone 40 is provided with a cooperating workpiece engaging element in the form of an idler cone 68 rotatably mounted thereon. A freely rotatable shaft 70 is journaled in top and bottom walls 59 and 61 respectively of the first leg 32. A gear 72 and a pinion 74 are fixed on shaft 70. Pinion 74 is in mesh with rack portion 66 of axle 64.

A piston housing 76, having an opening 78 in one end, is mounted within first leg 32 in a fixed position. A piston head 80 is disposed within housing 76 for movement in an axial direction therewithin and a piston rod 82 extends from one face of piston head 80 outwardly through the end of housing 76 opposite from the end having opening 78. A spring mounting post 84 is mounted to the interior face of side wall 55 of first leg 32 and one end of a spring 86 is engaged therewith. The opposite end of spring 86 is coupled to one end of a chain 88 which is trained around gear 72 and terminates at the end remote from spring 86 in a connection with the end of piston rod 82 remote from piston head 80.

A first air conduit 88 is shown in FIGURE 2 of the drawings and is connected at its end remote from yoke 26 with a source of air under pressure (not shown). The opposite end of a conduit 88 is coupled to a two-way air valve 90 mounted on the front of leg 32. A second air conduit 92 is connected to air valve 90 at one end, and to the end of housing 76 remote from opening 78 at the other end. It will be noted that air valve 90 is provided with an operating handle 94 which is disposed near operating handle 56 so that the two controls may be conveniently operated. It should be further understood that valve 90 is of a well known kind having a first position inter-connecting conduits 88 and 92, and a second position closing off conduit 88 and venting conduit 92 to atmosphere, the former being the position in which it is shown in FIGURE 2 of the drawings. A first accordion type dust shield 96 covers bearing 63 for axle 64 in wall 55 of leg 32 as viewed in FIGURE 2 and a second accordion type dust shield 98 covers bearing 65 for axle 64 in wall 57 of leg 32 as viewed in FIGURE 2. It is to be further noted in FIGURE 2 that a roller 100 is shown gripped between cones 40 and 68 for purposes of illustrating the manner in which the cone supports such a roller in position to be welded.

Referring now particularly to FIGURE 6 of the drawings, table 28 is shown to include a plurality of table legs 102 provided with feet 104 to support same above floor 106. Extending upwardly from legs 102 is a generally cylindrical housing 108. Contained within housing 108 is a hydraulic jack 110 having a jack shaft 112 which may be raised out of or lowered within jack 110 when the latter is operated by pumping a jack handle (not shown) as is well known. The uppermost extremity of shaft 112 supports a ball 114. Extending downwardly through the uppermost extremity of housing 108 is a table support shaft 116 which is provided with a socket in its lower extremity for receiving ball 114. Housing 108 is provided with a cylindrical housing support 118 having a central opening through which shaft 116 extends and a bearing 120 lines this opening and supports shaft 116. A similar type of bearing 122 is provided lining the opening in the upper extremity of housing 108 and also supports shaft 116. The uppermost extremity of shaft 116 is connected to a generally circular table top 124. It will be obvious from the description that shaft 116 supported as it is within bearings 120 and 122 and on top of ball 114 may be moved axially and rotated either separately or at the same time.

Swingable arm 30 is mounted upon a fixed axle 126 depending from leg 32. Swingable arm 30 is provided at one end with a bearing portion 128 which is rotatably mounted upon axle 126 as well as being axially slidable thereon. An adjustable collar 130 is secured to axle 126 below bearing portion 128 and is adjustable axially on axle 126 so that the arm 30 may be vertically adjusted to set the arc of swinging movement of the arm 30 in a particular horizontal plane. The adjusting means on collar 130 may be anything suitable such as a set screw. The end of arm 30 remote from bearing portion 128 is provided with a handle mounting bearing 132 in which is journaled handle 134. A handle receiving element 136 depends from leg 34 and may be in the form of a hook or spring clamp or the like and is positioned to receive handle 134 and releasably hold the latter until it is forcibly disengaged therefrom.

A movable carriage 138 is mounted on arm 30 intermediate bearing portion 128 and handle 134 and is movable longitudinally along central portion 140 of arm 30. Carriage 138 includes a tray portion having a bottom 142 and side walls 148, 150, 152 and 154. Adjacent the points of juncture between respective side walls 148 and 150 and respective end walls 152 and 154, there is fastened to side walls 148 and 150, legs 144, 146, 156 and 158. Each of the legs 144, 146, 156 and 158 is generally L-shaped and the legs disposed opposite each other are fastened to sides 148 and 150 in such a manner that the foot of the members extends underneath central portion 140 of arm 30 to guide the carriage 138 as it travels therealong and prevent the same from falling off. In addition, each of the legs 144, 146, 156 and 158 has mounted thereon a roller 160 which rests upon the central portion 140 of arm 30 such that four rollers 160 rollably support movable carriage 138 and render the same movable as previously described. A generally U-shaped bracket 162 is fixed to the center of the upwardly facing surface of bottom 142 across the bight portion of the bracket and the legs extend upwardly from bottom 142 and are provided with openings for journaling a pivot pin 164. Pivot pin 164 is rotatably journaled in the openings of the legs of bracket 162 and a collar 166 is fixed thereon from which extends an ejecting handle 168.

In operation, when the machine shown in the drawings is to be used, a plurality of rollers 100 are placed upon table top 124 and swingable arm 30 is pivoted in a clockwise direction to a position approximately tangent to the outer peripheral surface of table top 124. If the carriage 138 is higher than the table a sufficient amount to cause difficulty, adjustable collar 130 may be used to lower swingable arm 30 and thereby carriage 138 or jack 110 may be operated to raise table top 124. A roller 100 is rolled onto carriage 138 in the tray formed by walls 148, 150, 152 and 154 and bottom 142. The swingable arm 30 is then pivoted in a counterclockwise direction by the use of handle 134 and swung into a position where-in carriage 138 is disposed intermediate legs 32 and 34.

Operating handle 94 is then operated to move to the position shown in FIGURE 2 of the drawings by throwing the same through an arc in a counterclockwise direction. When handle 94 reaches the position shown in FIGURE 2, air conduits 88 and 92 are connected and air under pressure flows to one side of piston head 80 forcing the same to move toward opening 78. Air leaks out through opening 78 permitting movement of piston head 80 without resistance.

The movement of piston head 80 pulls chain 87 to rotate gear 72 and through shaft 70, pinion 74 which is engaged with rack portion 66 of axle 64 thereby sliding axle 64 in an axial direction toward roller 100. If the roller 100 is not properly positioned to be gripped between the cones 40 and 68, the air under pressure will force the cone 68 into the opening provided in roller 100 and push the same toward cone 40 until roller 100 is wedged between the two cones and gripped tightly, and the same is actually at the same time picked up from carriage 138. The welding operation may then be performed upon the roller 100 in the same manner as described in Patent No. 3,024,349.

The driving mechanism contained within leg 34 performs the function of rotating the roller 100 in the same manner described in Patent No. 3,024,349. It should be noted at this point, however, that the structure which, in its assembled condition, forms the pneumatic or hydraulic chucking mechanism is of such a weight and disposition that it balances the structure contained within leg 34 and thereby counterbalances yoke 26. The balance thereby created permits the yoke to be easily indexed manually. The present invention provides an operating handle 56 which can manipulate locking bar and plate mechanism 50 from the front of yoke 26 adjacent to operating handle 94 thereby contributing to the ease of operating the machine by eliminating traveling around to the rear of yoke 26 as previously required to operate the locking bar and plate mechanism 50.

After the roller 100 has been resurfaced as desired, the operating handle 94 may be thrown in the opposite direction venting conduit 92 to atmosphere and closing conduit 88 thereby permitting spring 86 to draw chain 87 in the opposite direction reversing gear 72 and pinion 74 which is in mesh with rack portion 66 of axle 64 thereby withdrawing cone 68 from roller 100 and permitting the latter to settle back into carriage 138. During this time, handle 134 has been securely held by handle receiving element 136 which may either be of the hook type as shown in FIGURE 3 of the drawings or of a spring clamp type such as is well known.

Now the handle 134 is manually pulled or released from element 136 and the arm 30 is once again pivoted in a clockwise direction to a position approximately tangent to table top 124. Ejecting handle 168 is then manually pushed toward table top 124 lifting and rolling the roller 100 back onto the table top 124 and ejecting it from the carriage 138. This mechanism enables the operator to remove rollers even while the same are still very hot and during the period wherein previously the rollers could not be handled thereby delaying the welding procedure. It is a simple matter then to rotate table top 124 slightly, roll the next roller upon the carriage and repeat the cycle.

As can be seen, the machine of the present invention presents a very advantageous operation since the welding operation on a plurality of rollers can be accomplished in the shortest possible time with the mechanism described. The structure described reduces the amount of manual raising and lowering of the rollers which was required by previous machines. It will also be noted that the provision of a movable carriage 138 supported on rollers 160, permits the operator to position the roller 100 between the legs 32 and 34 of yoke 26, and the carriage 138 will give the force exerted by axle 64 and cone 68, whereby positioning the roller 100 as desired beneath the welding means 24.

Naturally two welding means 24 could be accommodated on the same cross member 22 which would permit both sides of roller 100 to be resurfaced at the same time further reducing the total time consumed by the resurfacing operation. It should be further noted that the hydraulic jack on the table 28 permits table top 124 to be raised or lowered in addition to the adjustment for arm 30 such that objects of great variance in diameter may be accommodated and resurfaced such as the idlers of a track vehicle or other similar parts.

While I have shown and described a present preferred embodiment of the invention it is to be distinctly understood that the invention is not limited thereto but may be otherwise variously embodied within the scope of the following claims.

I claim:

1. Apparatus for manipulating workpieces comprising mounting means, a yoke, the yoke being mounted on the mounting means at the central portion of the yoke and being disposed in a generally horizontal plane, a workpiece supply, a transfer member mounted for swingable movement between a position adjacent the workpiece supply and a position in which a workpiece carried by the transfer member is disposed between the legs of the yoke, opposed workpiece engaging elements carried by the legs of the yoke and means for relatively moving the opposed workpiece engaging elements toward and away from each other to take the workpiece from the transfer member and return the same thereto.

2. Apparatus for manipulating workpieces comprising opposed mounting members, a rotary workpiece carrier, a transfer member mounted for swingable movement in a single horizontal plane only between a position adjacent the rotary workpiece carrier and a position in which a workpiece carried by the transfer member is disposed between the opposed mounting members, means for rotating the rotary workpiece carrier to position a workpiece adjacent the transfer member to facilitate transfer of the workpiece from the rotary workpiece carrier to the transfer member, opposed workpiece engaging elements carried by the opposed mounting members and means for relatively moving the opposed workpiece engaging elements toward and away from each other to take the workpiece from the transfer member and return the same thereto.

3. Apparatus for manipulating workpieces comprising opposed mounting members spaced apart in the same horizontal plane, a workpiece supply, a transfer member mounted upon one of the opposed mounting members for swingable movement between a position adjacent the workpiece supply and a position in which a workpiece carried by the transfer member is disposed between the opposed mounting members, opposed workpiece engaging elements carried by the opposed mounting members and means for relatively moving the opposed workpiece engaging elements toward and away from each other to take the workpiece from the transfer member and return the same thereto.

4. Apparatus for manipulating workpieces comprising opposed mounting members, a workpiece supply a transfer member mounted for swingable movement between a position adjacent the workpiece supply and a position in which a workpiece carried by the transfer member is disposed between the opposed mounting members, latching means for fastening the transfer member in said last mentioned position, opposed workpiece engaging elements carried by the opposed mounting members and means for relatively moving the opposed workpiece engaging elements toward and away from each other to take the workpiece from the transfer member and return the same thereto.

5. Apparatus for manipulating workpieces comprising opposed mounting members, a workpiece supply, a transfer member having a carriage mounted thereon, the transfer member being mounted for swingable movement between a position in which the carriage is adjacent the workpiece supply and a position in which a workpiece carried by the carriage is disposed between the opposed mounting members, opposed workpiece engaging elements carried by the opposed mounting members and means for relatively moving the opposed workpiece engaging elements toward and away from each other to take the workpiece from the carriage and return the same thereto, the carriage being movable along the transfer member to insure proper positioning of the workpiece to enable the workpiece to be taken by the opposed workpiece engaging elements upon movement of such elements toward each other and to receive the workpiece upon movement of such elements away from each other.

6. Apparatus for manipulating workpieces comprising opposed mounting members, a rotary workpiece carrier, a transfer member having a carriage mounted thereon, the transfer member being mounted for swingable movement between a position in which the carriage is adjacent the rotary workpiece carrier and a position in which a workpiece carried by the carriage is disposed between the opposed mounting members, means for rotating the rotary workpiece carrier to position a workpiece adjacent the carriage to facilitate transfer of the workpiece from the rotary workpiece carrier to the carriage, opposed workpiece engaging elements carried by the opposed mounting members and means for relatively moving the opposed workpiece engaging elements toward and away from each other to take the workpiece from the carriage and return the same thereto, the carriage being movable along the transfer member to insure proper positioning of the workpiece to enable the workpiece to be taken by the opposed workpiece engaging elements upon movement of such elements toward each other and to receive the workpiece upon movement of such elements away from each other.

7. Apparatus for manipulating workpieces comprising opposed mounting members, a workpiece carrier mounted for rotation about a vertical axis and comprising a surface upon which workpieces are adapted to rest, a transfer member having a carriage mounted thereon, the transfer member being mounted for swingable movement between a position in which the carriage is adjacent the rotary workpiece carrier and a position in which a workpiece carried by the carriage is disposed between the opposed mounting members, means for rotating the rotary workpiece carrier to position a workpiece adjacent the carriage to facilitate transfer of the workpiece from the rotary workpiece carrier to the carriage, opposed workpiece engaging elements carried by the opposed mounting members and means for relatively moving the opposed workpiece engaging elements toward and away from each other to take the workpiece from the carriage and return the same thereto, the carriage being movable along the transfer member to insure proper positioning of the workpiece to enable the workpiece to be taken by the opposed workpiece engaging elements upon movement of such elements toward each other and to receive the workpiece upon movement of such elements away from each other.

8. Apparatus for manipulating workpieces in relation to welding mechanism wherein the workpieces become hot comprising opposed mounting members, a workpiece supply, a transfer member mounted for swingable movement between a position adjacent the workpiece supply and a position in which a workpiece carried by the transfer member is disposed between the opposed mounting members, opposed workpiece engaging elements carried by the opposed mounting members, means for relatively moving the opposed workpiece engaging elements toward and away from each other to take the workpiece from the transfer member and, after welding while the workpiece is held by the opposed workpiece engaging elements, return the hot workpiece to the transfer member and an ejector for ejecting the hot workpiece from the transfer member.

References Cited by the Examiner

UNITED STATES PATENTS

| | | | |
|---|---|---|---|
| 240,985 | 5/1881 | Fellows | 82—2.5 X |
| 1,811,832 | 6/1931 | Mayers. | |
| 2,040,028 | 5/1936 | Smith | 82—2.5 |
| 3,008,382 | 11/1961 | Hawley. | |
| 3,024,349 | 3/1962 | Hinrichsen | 219—73 |
| 3,046,846 | 7/1962 | Bonnafe. | |

FOREIGN PATENTS 1,075,923  2/1960  Germany.

MARVIN A. CHAMPION, *Primary Examiner.*

HUGO O. SCHULZ, *Examiner.*